United States Patent
Fuss et al.

(10) Patent No.: US 8,299,955 B2
(45) Date of Patent: Oct. 30, 2012

(54) METHOD FOR CLEANING SIGNALS FOR CENTRALIZED ANTIJAMMING

(75) Inventors: Amaury Fuss, Bonnelles (FR); Laurent Savy, Vanves (FR)

(73) Assignee: Thales, Neuilly-sur-Seine (FR)

( * ) Notice: Subject to any disclaimer, the term of this patent is extended or adjusted under 35 U.S.C. 154(b) by 248 days.

(21) Appl. No.: 12/596,554

(22) PCT Filed: Apr. 16, 2008

(86) PCT No.: PCT/EP2008/054588
§ 371 (c)(1),
(2), (4) Date: Jan. 5, 2010

(87) PCT Pub. No.: WO2008/135355
PCT Pub. Date: Nov. 13, 2008

(65) Prior Publication Data
US 2010/0134342 A1    Jun. 3, 2010

(30) Foreign Application Priority Data
Apr. 17, 2007  (FR) ...................................... 07 02778

(51) Int. Cl.
*G01S 7/36* (2006.01)
*G01S 7/292* (2006.01)
*G01S 13/00* (2006.01)

(52) U.S. Cl. .............. 342/17; 342/13; 342/16; 342/159; 342/175; 342/195

(58) Field of Classification Search .............. 342/13–20, 342/89–103, 165, 173, 175, 192–197, 29–32, 342/159–164
See application file for complete search history.

(56) References Cited

U.S. PATENT DOCUMENTS

| | | | | |
|---|---|---|---|---|
| 4,359,736 A | * | 11/1982 | Lewis | 342/16 |
| 4,910,526 A | * | 3/1990 | Donnangelo et al. | 342/32 |
| 5,075,694 A | * | 12/1991 | Donnangelo et al. | 342/32 |
| 5,117,238 A | * | 5/1992 | Silverstein et al. | 342/196 |
| 5,122,732 A | * | 6/1992 | Engeler et al. | 342/14 |
| 5,168,214 A | * | 12/1992 | Engeler et al. | 342/192 |
| 5,617,099 A | * | 4/1997 | Warren et al. | 342/159 |
| 5,706,013 A | * | 1/1998 | Melvin et al. | 342/159 |
| 5,760,734 A | * | 6/1998 | Urkowitz | 342/159 |
| 6,252,540 B1 | * | 6/2001 | Hale et al. | 342/159 |
| 6,292,592 B1 | * | 9/2001 | Braunreiter et al. | 342/90 |
| 6,720,910 B2 | * | 4/2004 | Yu | 342/162 |
| 6,924,763 B2 | * | 8/2005 | Poullin | 342/159 |
| 6,940,450 B2 | * | 9/2005 | Blunt et al. | 342/195 |
| 6,999,025 B2 | * | 2/2006 | Poullin | 342/159 |
| 7,106,250 B2 | * | 9/2006 | Blunt et al. | 342/195 |
| 7,180,443 B1 | * | 2/2007 | Mookerjee et al. | 342/195 |
| 7,248,206 B1 | * | 7/2007 | Boka et al. | 342/90 |
| H2222 H | * | 8/2008 | Rangaswamy et al. | 342/159 |
| 7,477,190 B2 | * | 1/2009 | Bang et al. | 342/16 |
| 7,605,747 B1 | * | 10/2009 | Mookerjee et al. | 342/90 |
| 2005/0057392 A1 | * | 3/2005 | Blunt et al. | 342/195 |

* cited by examiner

*Primary Examiner* — Bernarr Gregory
(74) *Attorney, Agent, or Firm* — Baker & Hostetler LLP

(57) ABSTRACT

The present invention relates to a method for cleaning signals for centralized antijamming. The invention makes it possible to provide as many cleaned antenna channels as sub-arrays with limited computational requirements. The method proceeds in two steps. Initially, an antijamming matrix is computed. This matrix depends on the noise covariance matrix, on a weighting vector representing the form of the desired antenna pattern on reception in an unjammed environment, and on constraints for preserving the shape of this antenna pattern. Subsequently, the signals arising from the antenna sub-arrays undergo a linear recombination effected by the antijamming matrix. The antijamming method is termed centralized since the data necessary for the antijamming processing are concentrated in the lone antijamming matrix. The invention applies notably to radar systems, notably to airborne radar systems.

4 Claims, 1 Drawing Sheet

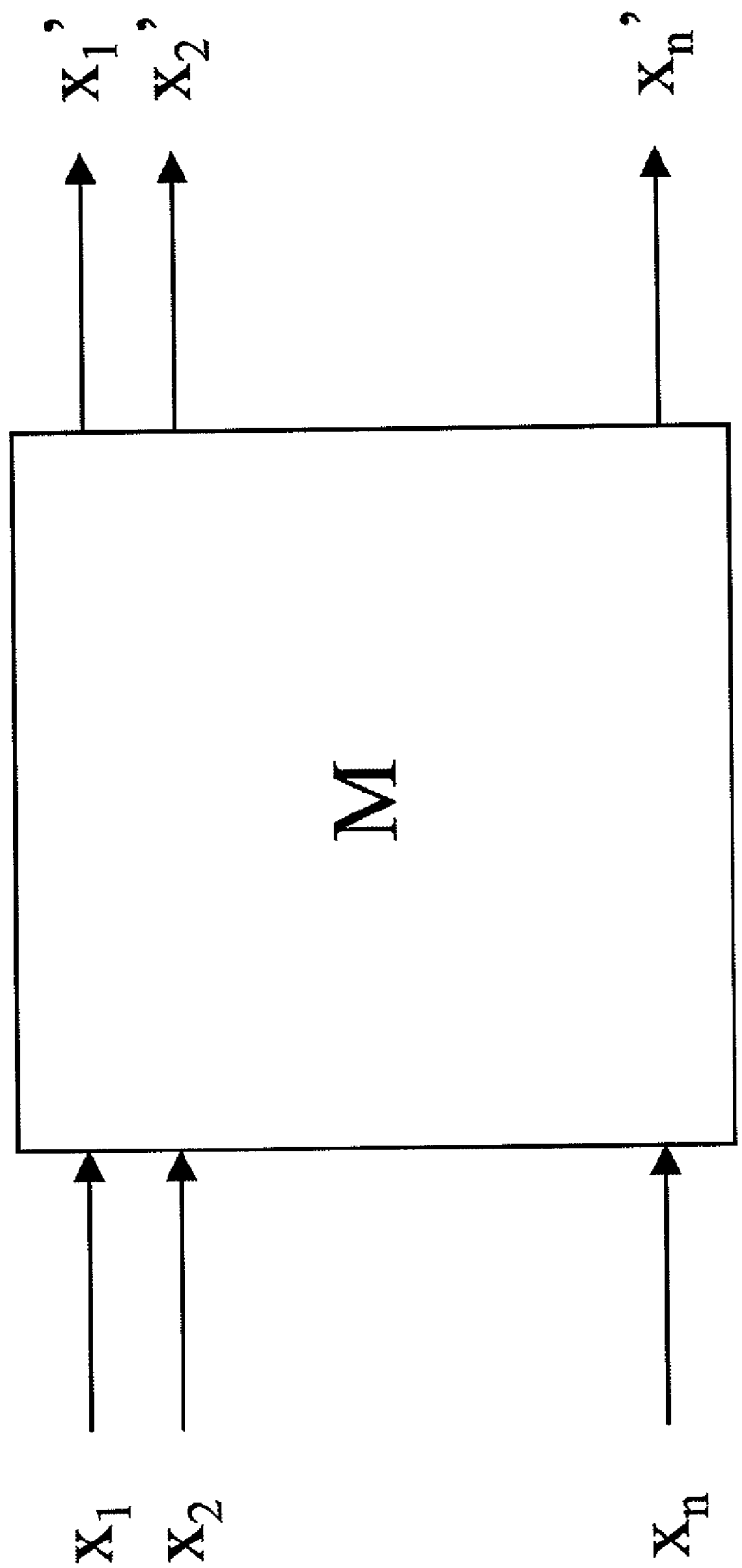

METHOD FOR CLEANING SIGNALS FOR CENTRALIZED ANTIJAMMING

FIELD OF THE DISCLOSURE

The present invention relates to a method for cleaning signals for centralized antijamming. It applies notably to radar systems, notably to airborne radar systems.

BACKGROUND OF THE DISCLOSURE

Technical progress in regard to radar has made it possible to progress toward the realization of multichannel radars, that is to say radars using several antenna sub-arrays. This type of radar makes it possible notably to carry out computational beamforming and offers better antijamming capability than single-antenna radars. Generally, the antijamming systems associated with multichannel radars apply a weighting coefficient $w_i$ to each of the signals $x_i$ arising from the N antenna sub-arrays before combining them to form a "sum channel" y according to the following formulation:

$$y = w^H \cdot x_{received} = \sum_{i=1}^{N} w_i^H \cdot xi = \sum_{i=1}^{N} yi, \qquad (1)$$

$x_{received}$ being the vector formed of the N signals $x_i$, $(\;)^H$ being the Hermitian operator.

The filtering vector w containing the Weighting coefficients $w_i$ is determined by an antijamming algorithm with a view to decreasing the gain of the antenna in the directions of arrival of the undesirable signals, while complying with a certain number of constraints making it possible to preserve good reception of the useful signal.

A major drawback of this antijamming method is the loss of the radar's multichannel characteristic, since only the sum channel y is cleaned. The signals yi arising from each weighting wi.xi of the antenna sub-arrays are not separately reusable, thus depriving the user of the radar of the numerous possibilities of spatio-temporal adaptive processings, applicable notably to the detection of moving targets and to synthetic aperture radar imaging. Moreover, from the point of view of the architecture of a system and more particularly of its interfaces, this antijamming method is not transparent since it transforms a set of N signals into a single output signal. The implementation of such a method within an existing multichannel radar reception chain may notably restrict the possibilities for adding downstream utilization devices since it modifies the number of outputs.

Procedures are known for producing at the output of an antijamming device as many cleaned channels as antenna sub-arrays. This involves computing according to an iterative algorithm the weighting coefficients of each of the cleaned channels. However, real-time operating constraints often being needed on radar systems, this procedure requires considerable computational means and is consequently not compatible with the hardware limits inherent in onboard systems.

In the case of conventional antijamming on a radar system with N antenna sub-arrays, it is possible, on the basis of a noise covariance matrix $\Gamma$ of dimension N×N, to determine a filtering vector w making it possible to reduce the gain of the antenna in the directions of the jammer signals. The covariance matrix $\Gamma$ is for example established during a phase of listening without prior emission of pulses by the radar. The power $P_0$ received by the radar after weighting the channels of the sub-arrays with the filtering vector w is then:

$$P_0 = w \cdot \Gamma \cdot w$$

It is then possible to use the "Linear Constraint Minimum Variance" or LCMV algorithm, proposed by Frost in 1972, to minimize this output power $P_0$ while preserving an antenna pattern allowing satisfactory reception of the useful signals. Thus, the search for the filtering vector w can be formulated as a constrained minimization problem expressed in the following form:

$$\begin{cases} P_0 = \min_w(w \cdot \Gamma \cdot w) \\ \text{with} \\ C^H \cdot w = f \end{cases}$$

where the matrix C of dimension N×$n_c$ represents the $n_c$ constraints to be satisfied so as to preserve the antenna pattern, the vector f of dimension $n_c$ contains the constraint values. The constraints may notably result in the conservation of a sufficient gain in the direction of observation of the radar and in the control of the level of the sidelobes of the antenna pattern. The objective of the antijamming processing being to increase the signal-to-noise ratio of the useful signal, it is in fact necessary to take care to decrease the amplitude of the jammer signals without altering the reception of the sought-after signals.

The solution obtained by using Lagrange multipliers gives:

$$w = \Gamma^{-1} \cdot C \cdot (C^H \cdot \Gamma^{-1} \cdot C)^{-1} \cdot f \qquad (2)$$

that is to say, by applying the Hermitian operator:

$$w^H = f^H \cdot (C^H \cdot \Gamma^{-1} \cdot C)^{-1} \cdot C^H \cdot \Gamma^{-1} \qquad (3)$$

Expression (3) is a filtering vector $w^H$ known to the person skilled in the art for applying a conventional antijamming processing.

SUMMARY OF THE DISCLOSURE

The antijamming method according to the invention makes it possible notably to provide as many cleaned antenna channels as sub-arrays with limited computational requirements. For this purpose, the subject of the invention is a method for filtering the noise in signals $x_i$ received by a radar having N antenna sub-arrays using a covariance matrix $\Gamma$ of the noise picked up by the sub-arrays, each sub-array receiving a signal $x_i$, said method comprising at least the following steps:

computing coefficients $M_{ij}$ of a matrix M, i and j varying from 1 to N, on the basis of the noise covariance matrix $\Gamma$, of a weighting vector $W_r$ representing a desired antenna pattern on reception in a clean environment, and of $n_c$ constraints for preserving the shape of this antenna pattern, said constraints being represented by a matrix C of dimension N×$n_c$ and by a vector f of dimension $n_c$, the matrix M being equal to:

$$\frac{w_r}{w_r^H \cdot w_r} \cdot f^H \cdot (C^H \cdot \Gamma^{-1} \cdot C)^{-1} \cdot C^H \cdot \Gamma^{-1}$$

calculating the product of the matrix M times the vector $x_{received}$ formed of the signals received $x_i$, the resulting vector being formed of the N filtered signals $x_i'$.

Advantageously, the product of the matrix M times the vector $x_{received}$ is parallelized as several scalar products calculated between a row of the matrix M and the vector $x_{received}$.

According to a variant of the invention, the matrix M is recomputed periodically so as to follow the jamming configuration.

Other characteristics and advantages of the invention will become apparent on reading the detailed description given by way of nonlimiting example which follows in conjunction with appended drawings which represent:

the single figure, an illustration of the method for cleaning signals according to the invention.

DETAILED DESCRIPTION OF EMBODIMENTS

Hereinbelow, the undesirable signals are regarded as akin to jamming and the processings implemented to counter them are dubbed "antijamming". The invention is also applicable to the cleaning of antenna channels picking up other types of undesirable signals.

In the absence of jammer signals, the antenna pattern desired by the user of the radar is obtained by applying a quiescent weighting vector $w_r$ to the signals $x_i$ picked up by the antenna sub-arrays. Stated otherwise, without jamming, the signal conveyed by the sum channel y is given by:

$$y = w_r^H \cdot x_{received} \quad (4)$$

Furthermore, it is possible to introduce the quiescent weighting vector $w_r$ into expression (3) without modifying it. This is achieved by multiplying the term on the right by the unit fraction $$\frac{w_r^H \cdot w_r}{w_r^H \cdot w_r}$$

$$w^H = \frac{w_r^H \cdot w_r}{w_r^H \cdot w_r} \cdot f^H \cdot (C^H \cdot \Gamma^{-1} \cdot C)^{-1} \cdot C^H \cdot \Gamma^{-1} \quad (5)$$

By rewriting expression (5), as follows:

$$w^H = w_r^H \cdot \left( \frac{w_r}{w_r^H \cdot w_r} \cdot f^H \cdot (C^H \cdot \Gamma^{-1} \cdot C)^{-1} \cdot C^H \cdot \Gamma^{-1} \right) \quad (6)$$

the filtering vector w then appears as the result of an operation which transforms the quiescent weighting vector $w_r$ by a matrix M:

$$w^H = w_r^H \cdot M \quad (7)$$

with $$M = \frac{w_r}{w_r^H \cdot w_r} \cdot f^H \cdot (C^H \cdot \Gamma^{-1} \cdot C)^{-1} \cdot C^H \cdot \Gamma^{-1} \quad (8)$$

The optimal filtering vector $w^H$ according to the criteria defined by the LCMV algorithm can therefore be expressed as the transformation of the quiescent vector $w_r$ by a matrix M dependent on the aforesaid constraints (C, f), on the noise covariance matrix $\Gamma$ and on the quiescent weighting vector $w_r$. Consequently, and according to expressions (1) and (7), the filtering of the signals $x_i$ arising from the antenna channels becomes:

$$y = w_r^H \cdot M \cdot x_{received} \quad (9)$$

Expression (9) shows that the matrix M can be considered to be an antijamming matrix. Indeed, i. the shape of the antenna pattern desired by the user in the case of unjammed reception is formulated in the quiescent weighting vector $w_r$, ii. a substantially identical shape of the antenna pattern—but nevertheless adapted to cleaned reception—is obtained in a jammed environment by applying a filtering vector $w^H$ resulting from a transformation of the weighting coefficients of $w_r$ by the matrix M.

Depending on whether or not jamming is present, the signal conveyed by the sum channel y thus takes respectively expressions (4) or (9):

without jamming, $y = w_r^H \cdot x_{received}$, with jamming and antijamming processing, $y = w_r^H \cdot M \cdot x_{received}$ Expression (9) can be viewed as the product of a weighting vector ($w_r^H \cdot M$) integrating an antijamming processing times the vector $X_{received}$ of signals picked up by the antennas:

$$y = (w_r^H \cdot M) \cdot x_{received}$$

But expression (9) can also be viewed as a product of the quiescent weighting vector $w_r$ times a vector x' of cleaned signals:

$$y = w_r^H \cdot (M \cdot x_{received}) = w_r^H \cdot x'.$$

This second interpretation shows that the application of weighting coefficients arising from the antijamming matrix M to the signals $x_i$ perceived by the antennas culminates in the formation of N channels of cleaned signals $x_i'$, as detailed hereinafter:

$$x' = \begin{bmatrix} x_1' \\ \vdots \\ x_k' \\ \vdots \\ x_n' \end{bmatrix} = \quad (10)$$

$$M \cdot x = \begin{bmatrix} M_{11} & \cdots & \cdots & M_{1n} \\ \vdots & & & \vdots \\ M_{k1} & & & M_{kn} \\ \vdots & & & \vdots \\ M_{n1} & \cdots & \cdots & M_{nn} \end{bmatrix} \cdot \begin{bmatrix} x_1 \\ \vdots \\ x_k \\ \vdots \\ x_n \end{bmatrix} = \begin{bmatrix} M_{11} \cdot x_1 + \ldots + M_{1n} \cdot x_n \\ \vdots \\ M_{k1} \cdot x_1 + \ldots + M_{kn} \cdot x_n \\ \vdots \\ M_{n1} \cdot x_1 + \ldots + M_{nn} \cdot x_n \end{bmatrix}$$

The antijamming weighting coefficients $M_{ij}$ present in the $i^{th}$ row of the matrix M are used to produce the $i^{th}$ cleaned signal $x_i'$. The weighting coefficients $M_{ij}$ applied to the signals $x_j$ depend:

on the shape of the antenna pattern, this item of information being contained in the quiescent weighting vector $w_r$, on the constraints for preserving this antenna pattern, this information being contained in the matrix C and the vector f, on the configuration of the jamming environment, this item of information being contained in the noise covariance matrix $\Gamma$.

FIG. 1 illustrates the method for cleaning signals according to the invention. Once an antenna pattern and its preservation constraints (C, f) have been chosen and a noise covariance matrix $\Gamma$ determined, the antijamming matrix M can be easily computed by applying expression (8). Once the antijamming matrix M has been computed, it suffices to multiply it (10) by the signals $x_i$ received by the antenna sub-arrays. Linear combination of the weighting coefficients $M_{ij}$ with the signals $x_i$ generates N cleaned signals $x_i'$. The antijamming method is centralized since the lone antijamming matrix M suffices to effect the cleaning of the sub-array channels.

The vector $w_r^H$ present in expression (9) is a summator. A product of this summator $w_r^H$ with the vector x' of cleaned signals reduces the N cleaned signals $x_i'$ to a single cleaned "sum signal".

For a given mode of reception, when the jammer environment remains invariant over time, there is no requirement to recompute the antijamming matrix M. In the converse case, the antijamming matrix M may for example be recomputed periodically so as to follow the jamming configuration.

According to a variant of the invention, the antijamming computation (10) is parallelized. Each cleaned signal x' can be computed independently of the others, thereby permitting parallel execution of the arithmetic operations for the scalar product of a row of the antijamming matrix M times the vector $x_{received}$.

Moreover, deactivation of the antijamming processing amounts to imposing an antijamming matrix M equal to the identity matrix.

An advantage of the centralized antijamming method according to the invention is that it renders the cleaned signals reusable so as to perform utilization processings such as spatio-temporal adaptive processings. Moreover, the antijamming method itself is in no way tied to a particular post-processing, thereby making it possible to preserve a decorrelation between the reception chain and a downstream utilization chain.

Another advantage of the method according to the invention is the low computational cost necessary, thus rendering the method usable in onboard systems requiring real-time operation. Indeed, once the antijamming matrix has been computed, the antijamming processing is performed in a step of computations (10) consisting of a matrix-vector product. Moreover, a parallelization of the antijamming processing on the N antenna sub-array channels makes it possible to divide substantially by N the time required for computing the cleaned signals.

Moreover, the embedding of the method according to the invention in an existing radar reception chain is quasi-transparent. Indeed, the antijamming method does not require modification of the architecture of the reception chain since the N signals arising from the antenna sub-arrays are transformed into N cleaned antenna signals. A user having already predefined several multichannel reception modes, that is to say several shapes of antenna pattern, can insert the antijamming method into the reception chain and reuse the reception modes. Furthermore, replacing an antijamming method according to the prior art set forth above with the method according to the invention does not affect the architecture of the reception chain, since the application of the summator vector $w_r^H$ to the cleaned signals makes it possible to obtain a sum channel signal, as for conventional antijamming.

Finally, it is possible to activate and to deactivate the antijamming processing without modifying the radar reception chain, deactivation of the antijamming processing being effected very simply by imposing an identity matrix in the guise of antijamming matrix.

The invention claimed is:

1. A method for filtering noise using a covariance matrix $\Gamma$ of the noise, said method comprising at least the following steps:

receiving signals $x_i$ by a radar having N antenna sub-arrays, wherein each sub array receives a signal $x_i$;

computing coefficients $M_{ij}$ of a matrix M, i and j varying from 1 to N, on the basis of the noise covariance matrix $\Gamma$, of a weighting vector $w_r$ representing a desired antenna pattern on reception in a clean environment, and of $n_c$ constraints for preserving the shape of this antenna pattern, said constraints being represented by a matrix C of dimension N×$n_c$ and by a vector f of dimension $n_c$, the matrix M being equal to:

$$\frac{w_r}{w_r^H \cdot w_r} \cdot f^H \cdot (C^H \cdot \Gamma^{-1} \cdot C)^{-1} \cdot C^H \cdot \Gamma^{-1}$$

calculating using a computer processor the product of the matrix M times the vector $x_{received}$ formed of the signals received $x_i$, the resulting vector being formed of the N filtered signals $x_i'$.

2. The method for filtering noise as claimed in claim 1, wherein the product of the matrix M times the vector $x_{received}$ is parallelized as several scalar products calculated between a row of the matrix M and the vector $X_{received}$.

3. The method for filtering noise as claimed in claim 2, wherein the matrix M is recomputed periodically so as to following the jamming configuration.

4. The method for filtering noise as claimed in claim 1, wherein the matrix M is recomputed periodically so as to following the jamming configuration.

* * * * *